United States Patent
Hall et al.

(10) Patent No.: US 11,567,318 B1
(45) Date of Patent: Jan. 31, 2023

(54) DETERMINING FEATURES OF A USER'S EYE FROM DEPTH MAPPING OF THE USER'S EYE VIA INDIRECT TIME OF FLIGHT

(71) Applicant: Meta Platforms Technologies, LLC, Menlo Park, CA (US)

(72) Inventors: Michael Hall, Seattle, WA (US); Xinqiao Liu, Medina, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 16/135,452

(22) Filed: Sep. 19, 2018

Related U.S. Application Data (60) Provisional application No. 62/562,805, filed on Sep. 25, 2017.

(51) Int. Cl.
| | | |
|---|---|---|
| G02B 27/01 | (2006.01) | |
| G06F 3/01 | (2006.01) | |
| G01B 11/22 | (2006.01) | |
| G06T 19/00 | (2011.01) | |
| G06V 40/18 | (2022.01) | |

(52) U.S. Cl.
CPC .......... *G02B 27/017* (2013.01); *G01B 11/22* (2013.01); *G06F 3/013* (2013.01); *G06T 19/006* (2013.01); *G06V 40/193* (2022.01)

(58) Field of Classification Search
CPC .. G06K 9/0061; G06K 9/00604; G06F 3/013; G06F 3/017; G01B 11/12; G02B 27/017; G02B 27/0093; G02B 27/0172; G06T 19/006; G06T 13/40
USPC .......................................................... 345/8
See application file for complete search history.

(56) References Cited

U.S. PATENT DOCUMENTS

| | | | | |
|---|---|---|---|---|
| 4,340,819 A * | 7/1982 | Ogasawara | ............ | H04N 5/353 348/E3.019 |
| 4,905,033 A * | 2/1990 | Ishida | ............... | H01L 27/14856 348/297 |
| 5,115,321 A * | 5/1992 | Ishida | ............... | G02B 7/34 348/297 |
| 9,271,648 B2 * | 3/2016 | Durnell | ............... | A61B 3/113 |
| 9,454,699 B2 * | 9/2016 | Agrawal | ............... | G06K 9/0061 |
| 9,646,207 B2 * | 5/2017 | Kuldkepp | ............... | G06K 9/00604 |
| 9,785,249 B1 * | 10/2017 | Nie | ............... | G06F 3/017 |
| 9,804,670 B2 * | 10/2017 | Kim | ............... | G06F 3/013 |
| 9,898,868 B2 * | 2/2018 | Aonuma | ............... | G06T 19/006 |
| 9,989,765 B2 * | 6/2018 | Jepsen | ............... | G02B 27/0172 |
| 10,303,246 B2 * | 5/2019 | Vidal | ............... | G01S 17/88 |

(Continued)

FOREIGN PATENT DOCUMENTS

CN        109716754 A *  5/2019   ......... G06K 9/2009

*Primary Examiner* — Fred Tzeng
(74) *Attorney, Agent, or Firm* — Fenwick & West LLP (57) ABSTRACT

An eye monitoring system is included in a headset of a virtual reality system or of an augmented reality system. The eye monitoring system determines distances between the eye monitoring system and portions of a user's eye enclosed by the headset. The eye monitoring system projects a temporally periodic pattern of light onto the user's eye via a sensor. The eye monitoring system determines a distance between the eye monitoring system and locations of the user's eye based on a phase shift of the periodic pattern of light captured by each pixel of the sensor. From the determined distances, the eye monitoring system determines features of the user's eye.

19 Claims, 7 Drawing Sheets

(56) References Cited

U.S. PATENT DOCUMENTS

| | | | |
|---|---|---|---|
| 10,345,903 B2* | 7/2019 | Robbins | G02B 27/017 |
| 2005/0161713 A1* | 7/2005 | Rhodes | G01B 3/1056 |
| | | | 257/292 |
| 2014/0375541 A1* | 12/2014 | Nister | G06F 3/013 |
| | | | 345/156 |
| 2015/0009236 A1* | 1/2015 | Saito | G02B 27/017 |
| | | | 345/656 |
| 2015/0185475 A1* | 7/2015 | Saarikko | G02B 6/02085 |
| | | | 382/117 |
| 2016/0139265 A1* | 5/2016 | Yahav | G01S 17/06 |
| | | | 356/51 |
| 2017/0068091 A1* | 3/2017 | Greenberg | G06F 3/013 |
| 2017/0103440 A1* | 4/2017 | Xing | H04W 4/90 |
| 2017/0173262 A1* | 6/2017 | Veltz | A61M 5/1723 |
| 2017/0352178 A1* | 12/2017 | Katz | G06T 13/40 |
| 2017/0352183 A1* | 12/2017 | Katz | G06T 19/006 |
| 2018/0088323 A1* | 3/2018 | Bao | G01C 21/365 |
| 2018/0114298 A1* | 4/2018 | Malaika | G02B 27/0093 |
| 2018/0188688 A1* | 7/2018 | Maimone | G03H 1/0866 |

\* cited by examiner

DETERMINING FEATURES OF A USER'S EYE FROM DEPTH MAPPING OF THE USER'S EYE VIA INDIRECT TIME OF FLIGHT

CROSS-REFERENCE TO RELATED APPLICATIONS

This application claims priority to U.S. Provisional Application No. 62/562,805, filed Sep. 25, 2017, which is incorporated by reference in its entirety.

BACKGROUND

The present disclosure generally relates to monitoring an eye of a user of a virtual or augmented reality system, and more specifically related to determining depth information about the eye of the user to identify features of the eye of the user.

Providing virtual reality (VR) or augmented reality (AR) content to users through a head mounted display (HMD) often is improved by accurately tracking optical axes of eyes of a user to whom the VR or AR augment is presented. For example, accurate determination of optical axes of a user's eyes allows a display of a VR or an AR system to move to accommodate an expected depth of field corresponding to an expected focal point of the user's eyes. As another example, tracking the user's eyes allows a VR system or an AR system to provide variable resolution content that matches spatial resolution capability of the user's eyes as user's eyes are directed to different positions within a display of the VR system or of the AR system.

Additionally, many AR systems include a predefined region for a user's eye, referred to as an "eye box." Increasing the size of the eye box allows the user's eye to have greater movement relative to a display of the AR system without adverse effects. However, increasing the size of the eye box makes less efficient user of optical power.

However, human eyes rotate over a wide range of angles, up to 55 degrees, in various directions very quickly and unpredictably, complicating tracking of eye movement. Additionally, human eyes are non-spherical and significantly vary in shape for different people, further complicating eye tracking. Many conventional methods for eye tracking rely on model assumptions (e.g., treating the cornea and sclera of an eye as perfect spheres) that limit accuracy of optical axis determination.

Many conventional techniques for eye tracking use a patterned illumination source in conjunction with a standard imaging camera to determine location of "glints" reflected off of an eye, where a glint is a virtual image of the illumination source observed behind the eye's surface. After detecting a threshold number of glints, a model uses a spherical assumption for the eye shape and for the corneal shape along with the glints to infer an approximate geometry of the eye. Subsequently the eye's optical axis is assumed to be perpendicular to a front center surface of the cornea identified by the model. However, human eyes differ widely between people and often violate the spherical assumption of conventional models.

SUMMARY

A head mounted display (HMD) in a virtual reality (VR) or augmented reality (AR) system environment includes an eye monitoring system configured to determine distances between the eye monitoring system and portions of a user's eye enclosed by the HMD and within a field of view of an imaging device included in the HMD. The eye monitoring system includes the imaging device, such as a camera, and an illumination source. The illumination source is configured to emit a series of periodic illumination patterns into an area within the HMD between the eye monitoring system and an exit pupil of the HMD, which specifies a location of the user's eye. Each periodic illumination pattern of the series is phase shifted by a different amount in various embodiments. The periodicity of the illumination pattern is a temporal periodicity.

The imaging device captures frames including the periodic illumination patterns via a sensor including multiple pixels and coupled to a processor. For each pixel of the sensor, a controller included in the eye monitoring system relates intensities captured by a pixel in multiple images to a phase shift of a periodic illumination pattern captured by the multiple images. From the phase shift of the periodic illumination pattern captured by the pixel, the controller determines a depth of a location of the user's eye from which the pixel captured the intensities of the periodic illumination pattern from the eye monitoring system. Each pixel of the sensor may independently determine a depth based on captured intensities of the periodic illumination pattern, optimally using the pixels of the sensor of the DCA.

From the depths from different locations of the user's eye to the eye monitoring system, the controller identifies various features of the user's eye. For example, the controller identifies a location of the pupil of the user's eye based on locations of the user's eye for which a maximum depth from the eye monitoring system was determined. As another example, the controller determines a location of the iris of the user's eye based on the determined depths, and may identify the location of the iris of the user's eye as locations having determined depths within a threshold distance of each other and within a threshold distance of the identified location of the pupil of the user's eye. Additionally, from the location of the pupil of the user's eye and the location of the iris of the user's eye, the controller may also determine an optical axis of the user's eye by determining a normal to the location corresponding to the pupil of the user's eye. In various embodiments, the controller also determines a visual axis of the user's eye based on the determined optical axis of the user's eye through any suitable method or methods.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
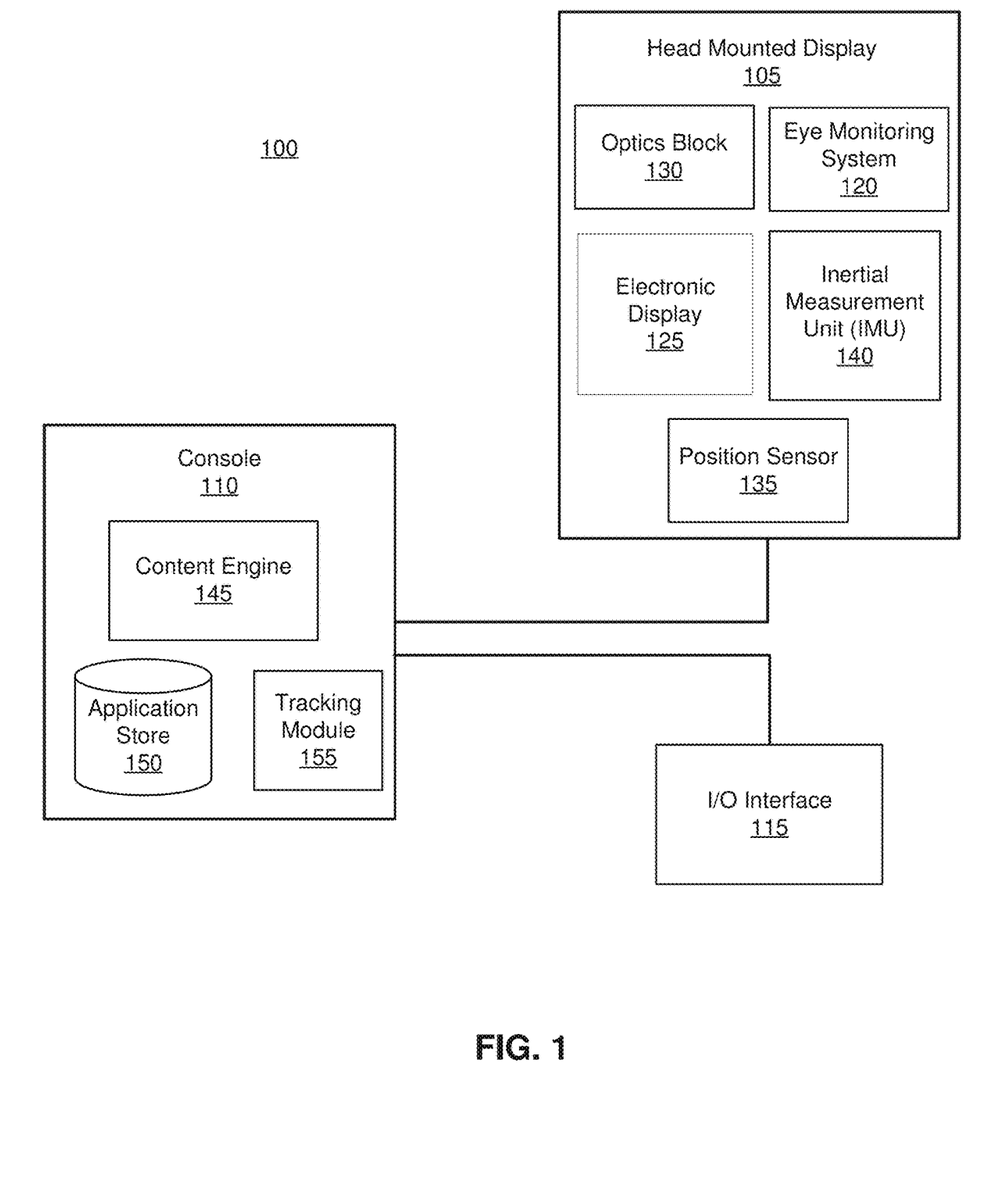
FIG. 1 is a block diagram of a system environment for providing virtual reality or augmented reality content, in accordance with an embodiment.

FIG. 1 is a block diagram of one embodiment of a system environment 100 in which a console 110 operates. The system environment 100 shown in FIG. 1 may provide augmented reality (AR) or virtual reality (VR) content to users in various embodiments. Additionally or alternatively, the system environment 100 generates one or more virtual environments and presents a virtual environment with which a user may interact to the user. The system environment 100 shown by FIG. 1 comprises a head mounted display (HMD) 105 and an input/output (I/O) interface 115 that is coupled to a console 110. While FIG. 1 shows an example system environment 100 including one HMD 105 and one I/O interface 115, in other embodiments any number of these components may be included in the system environment 100. For example, there may be multiple HMDs 105 each having an associated I/O interface 115, with each HMD 105 and I/O interface 115 communicating with the console 110. In alternative configurations, different and/or additional components may be included in the system environment 100. Additionally, functionality described in conjunction with one or more of the components shown in FIG. 1 may be distributed among the components in a different manner than described in conjunction with FIG. 1 in some embodiments. For example, some or all of the functionality of the console 110 is provided by the HMD 105.

The head mounted display (HMD) 105 presents content to a user comprising augmented views of a physical, real-world environment with computer-generated elements (e.g., two dimensional (2D) or three dimensional (3D) images, 2D or 3D video, sound, etc.) or presents content comprising a virtual environment. In some embodiments, the presented content includes audio that is presented via an external device (e.g., speakers and/or headphones) that receives audio information from the HMD 105, the console 110, or both, and presents audio data based on the audio information. An embodiment of the HMD 105 is further described below in conjunction with FIGS. 2 and 3. The HMD 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The HMD 105 includes an eye monitoring system 120, an electronic display 125, an optics block 130, one or more position sensors 135, and an inertial measurement unit (IMU) 140. Some embodiments of The HMD 105 have different components than those described in conjunction with FIG. 1. Additionally, the functionality provided by various components described in conjunction with FIG. 1 may be differently distributed among the components of the HMD 105 in other embodiments.

The eye monitoring system 120 captures data describing depth information of an eye of the user wearing the HMD 105. Some embodiments of the eye monitoring system 120 include one or more imaging devices (e.g., a camera, a video camera) and an illumination source configured to emit a series of periodic illumination patterns, with each periodic illumination pattern phase shifted by a different amount. As another example, the illumination source emits a series of sinusoids that each have a specific spatial phase shift. The periodicity of the illumination pattern is a temporal periodicity in which the an illumination source emits a portion of an illumination pattern. For example, the illumination source emits narrow pulses of illumination or a continuously modulated waveform onto an eye of a user positioned within the HMD 105.

The imaging device of the eye monitoring system 120 includes a sensor comprising multiple pixels that determine a phase shift of a periodic illumination pattern included in multiple images captured by the imaging device based on relative intensities included in the multiple captured images. As the phase shift is a function of depth, the eye monitoring system 120 determines depths of different locations of the eye of the user from which light emitted by the illumination source was reflected and captured in images captured by the imaging device from the determined phase shift, as further described below in conjunction with FIGS. 4 and 5. In various embodiments, each pixel of the sensor of the imaging device determines a depth of a location of the eye of the user from which a pixel captured intensities of a periodic illumination pattern emitted by the illumination source based on a phase shift determined for the periodic illumination pattern captured by the pixel. The imaging device captures and records particular ranges of wavelengths of light (i.e., "bands" of light). In various embodiments, the imaging device captures light in an infrared (IR) band (~750 nm to 2,200 nm); however, in other embodiments, the imaging device captures light from any suitable portion of the electromagnetic spectrum or from any suitable combination of portions of the electromagnetic spectrum. For example, the imaging device captures light in a narrow band of wavelengths based on a wavelength of light emitted by the illumination source; in an example, the illumination source emits light at a wavelength of 850 nm, and the imaging device captures light having wavelengths between 840 nm and 860 nm. In other examples, the illumination source emits light at a wavelength of 940 nm, and the imaging device captures light having wavelengths between 930 nm and 950 nm, or the illumination source emits light at a wavelength of 1550 nm, and the imaging device captures light having wavelengths between 1540 nm and 1560 nm The electronic display 125 displays 2D or 3D images to the user in accordance with data received from the console 110. In various embodiments, the electronic display 125 comprises a single electronic display or multiple electronic displays (e.g., a display for each eye of a user). Examples of the electronic display 125 include: a liquid crystal display (LCD), an organic light emitting diode (OLED) display, an active-matrix organic light-emitting diode display (AMOLED), some other display, or some combination thereof.

The optics block 130 magnifies image light received from the electronic display 125, corrects optical errors associated with the image light, and presents the corrected image light to a user of the HMD 105. In various embodiments, the optics block 130 includes one or more optical elements.

Example optical elements included in the optics block 130 include: an aperture, a Fresnel lens, a convex lens, a concave lens, a filter, a reflecting surface, or any other suitable optical element that affects image light. Moreover, the optics block 130 may include combinations of different optical elements. In some embodiments, one or more of the optical elements in the optics block 130 may have one or more coatings, such as anti-reflective coatings.

Magnification and focusing of the image light by the optics block 130 allows the electronic display 125 to be physically smaller, weigh less and consume less power than larger displays. Additionally, magnification may increase the field of view of the content presented by the electronic display 125. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optics block 130 may be designed to correct one or more types of optical error. Examples of optical error include barrel distortions, pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 125 for display is pre-distorted, and the optics block 130 corrects the distortion when it receives image light from the electronic display 125 generated based on the content.

The IMU 140 is an electronic device that generates data indicating a position of the HMD 105 based on measurement signals received from one or more of the position sensors 135 and from depth information received from the DCA 120. A position sensor 135 generates one or more measurement signals in response to motion of the HMD 105. Examples of position sensors 135 include: one or more accelerometers, one or more gyroscopes, one or more magnetometers, another suitable type of sensor that detects motion, a type of sensor used for error correction of the IMU 140, or some combination thereof. The position sensors 135 may be located external to the IMU 140, internal to the IMU 140, or some combination thereof.

Based on the one or more measurement signals from one or more position sensors 135, the IMU 140 generates data indicating an estimated current position of the HMD 105 relative to an initial position of the HMD 105. For example, the position sensors 135 include multiple accelerometers to measure translational motion (forward/back, up/down, left/right) and multiple gyroscopes to measure rotational motion (e.g., pitch, yaw, roll). In some embodiments, the IMU 140 rapidly samples the measurement signals and calculates the estimated current position of the HMD 105 from the sampled data. For example, the IMU 140 integrates the measurement signals received from the accelerometers over time to estimate a velocity vector and integrates the velocity vector over time to determine an estimated current position of a reference point on the HMD 105. Alternatively, the IMU 140 provides the sampled measurement signals to the console 110, which interprets the data to reduce error. The reference point is a point that may be used to describe the position of the HMD 105. The reference point may generally be defined as a point in space or a position related to the HMD's 105 orientation and position.

The IMU 140 receives one or more parameters from the console 110. As further discussed below, the one or more parameters are used to maintain tracking of the HMD 105. Based on a received parameter, the IMU 140 may adjust one or more IMU parameters (e.g., sample rate). In some embodiments, certain parameters cause the IMU 140 to update an initial position of the reference point so it corresponds to a next position of the reference point. Updating the initial position of the reference point as the next calibrated position of the reference point helps reduce accumulated error associated with the current position estimated the IMU 140. The accumulated error, also referred to as drift error, causes the estimated position of the reference point to "drift" away from the actual position of the reference point over time. In some embodiments of the HMD 105, the IMU 140 may be a dedicated hardware component. In other embodiments, the IMU 140 may be a software component implemented in one or more processors.

The I/O interface 115 is a device that allows a user to send action requests and receive responses from the console 110. An action request is a request to perform a particular action. For example, an action request may be an instruction to start or end capture of image or video data or an instruction to perform a particular action within an application. The I/O interface 115 may include one or more input devices. Example input devices include: a keyboard, a mouse, a game controller, or any other suitable device for receiving action requests and communicating the action requests to the console 110. An action request received by the I/O interface 115 is communicated to the console 110, which performs an action corresponding to the action request. In some embodiments, the I/O interface 115 includes an IMU 140, as further described above, that captures calibration data indicating an estimated position of the I/O interface 115 relative to an initial position of the I/O interface 115. In some embodiments, the I/O interface 115 may provide haptic feedback to the user in accordance with instructions received from the console 110. For example, haptic feedback is provided when an action request is received, or the console 110 communicates instructions to the I/O interface 115 causing the I/O interface 115 to generate haptic feedback when the console 110 performs an action.

The console 110 provides content to the HMD 105 for processing in accordance with information received from one or more of: the eye monitoring system 120, the HMD 105, and the I/O interface 115. In the example shown in FIG. 1, the console 110 includes an application store 150, a tracking module 155 and a content engine 145. Some embodiments of the console 110 have different modules or components than those described in conjunction with FIG. 1. Similarly, the functions further described below may be distributed among components of the console 110 in a different manner than described in conjunction with FIG. 1.

The application store 150 stores one or more applications for execution by the console 110. An application is a group of instructions, that when executed by a processor, generates content for presentation to the user. Content generated by an application may be in response to inputs received from the user via movement of the HMD 105 or the I/O interface 115. Examples of applications include: gaming applications, conferencing applications, video playback applications, or other suitable applications.

The tracking module 155 calibrates the system environment 100 using one or more calibration parameters and may adjust one or more calibration parameters to reduce error in determination of the position of the HMD 105 or of the I/O interface 115. For example, the tracking module 155 communicates a calibration parameter to the eye tracking system 120 to adjust the focus of the eye tracking system 120 to more accurately determine depths of locations of the eye of the user within the HMD 105 from captured intensities. Calibration performed by the tracking module 155 also accounts for information received from the IMU 140 in the HMD 105 and/or an IMU 140 included in the I/O interface 115. Additionally, if tracking of the HMD 105 is lost, the tracking module 140 may re-calibrate some or all of the system environment 100.

The tracking module 155 tracks movements of the HMD 105 or of the I/O interface 115 using information from the DCA 120, the one or more position sensors 135, the IMU 140 or some combination thereof. For example, the tracking module 155 determines a position of a reference point of the HMD 105 in a mapping of a local area based on information from the HMD 105. The tracking module 155 may also determine positions of the reference point of the HMD 105 or a reference point of the I/O interface 115 using data indicating a position of the HMD 105 from the IMU 140 or using data indicating a position of the I/O interface 115 from an IMU 140 included in the I/O interface 115, respectively. Additionally, in some embodiments, the tracking module 155 may use portions of data indicating a position of the HMD 105 from the IMU 140 to predict a future location of the HMD 105. The tracking module 155 provides the estimated or predicted future position of the HMD 105 or the I/O interface 115 to the content engine 145.

The content engine 145 generates content for presentation to the user via the HMD 105. In some embodiments, the content engine 145 generates a 3D mapping of the area surrounding the HMD 105 based on information received from a depth camera assembly included in the HMD 105 or based on any other suitable information describing the area surrounding the HMD 105. In some embodiments, based on information from the eye monitoring system 120 (e.g., orientation of the user's eye), the content engine 145 determines resolution of the content provided to the HMD 105 for presentation to the user on the electronic display 125. For example, the content engine 145 provides the content to the HMD 105 having a maximum pixel resolution on the electronic display 125 in a foveal region of the user's gaze, while the content engine 145 provides a lower pixel resolution in other regions of the electronic display 125, which reduces power consumption by the HMD 105 and saves computing cycles of the console 110 without compromising visual experience of the user. In some embodiments, the content engine 145 further uses the eye tracking information to adjust where objects are displayed on the electronic display 125 to prevent vergence-accommodation conflict.

The content engine 145 also executes applications within the system environment 100 and receives position information, acceleration information, velocity information, predicted future positions, or some combination thereof, of the HMD 105 from the tracking module 155. Based on the received information, the content engine 145 determines content to provide to the HMD 105 for presentation to the user. For example, if the received information indicates that the user has looked to the left, the content engine 145 generates content for the HMD 105 that mirrors the user's movement in a virtual environment or in an environment augmenting the local area with additional content. Additionally, the content engine 145 performs an action within an application executing on the console 110 in response to an action request received from the I/O interface 115 and provides feedback to the user that the action was performed. The provided feedback may be visual or audible feedback via the HMD 105 or haptic feedback via the I/O interface 115.

Head Mounted Display

Figure 2:
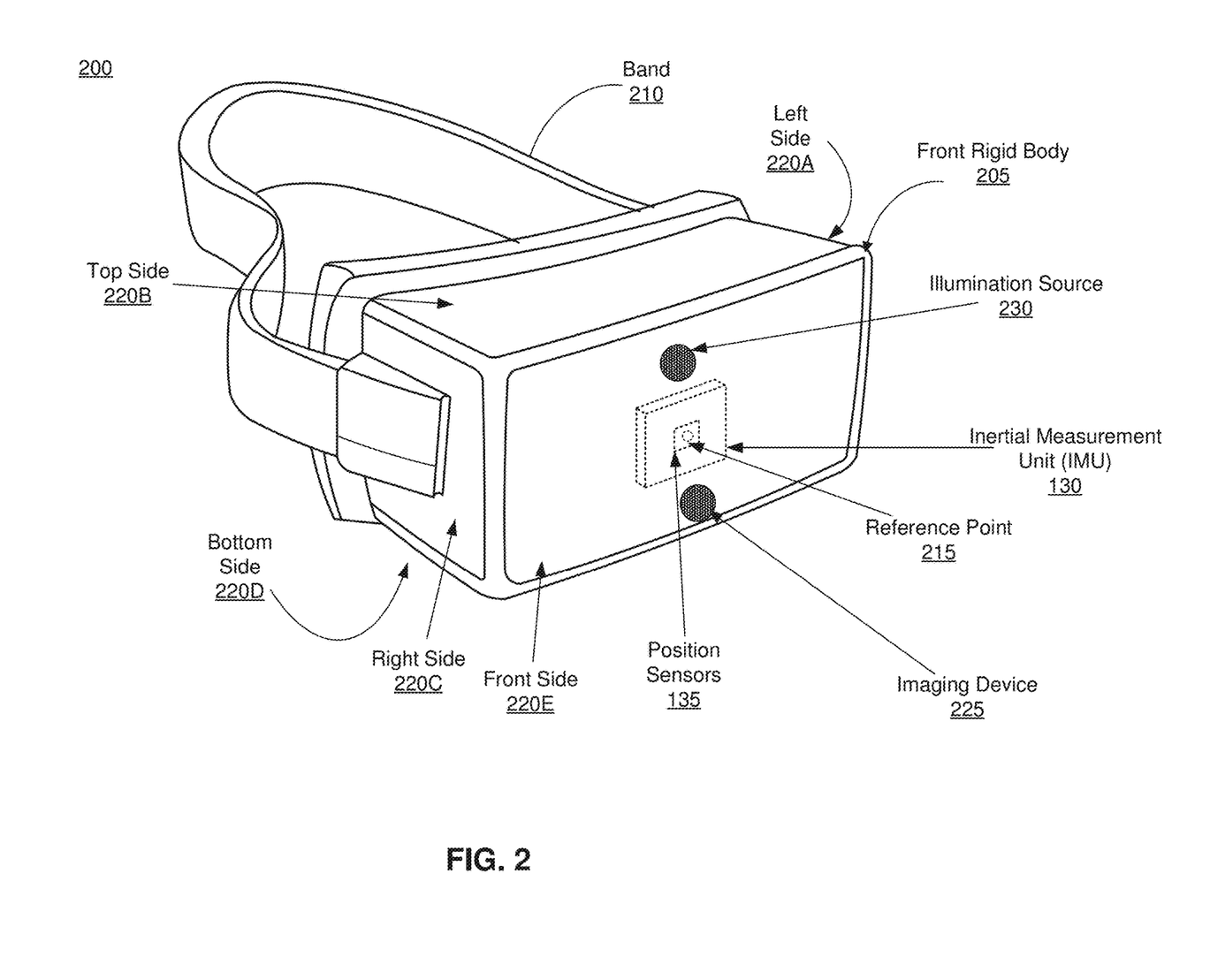
FIG. 2 is a diagram of a head mounted display (HMD), in accordance with an embodiment.

FIG. 2 is a wire diagram of one embodiment of a head mounted display (HMD) 200. The HMD 200 is an embodiment of the HMD 105, and includes a front rigid body 205, a band 210, a reference point 215, a left side 220A, a top side 220B, a right side 220C, a bottom side 220D, and a front side 220E. The HMD 200 shown in FIG. 2 also includes an embodiment of an eye monitoring system 120 including an imaging device 225 and an illumination source 230, which are further described below in conjunction with FIGS. 3 and 4. The front rigid body 205 includes one or more electronic display elements of the electronic display 125 (not shown), the IMU 130, the one or more position sensors 135, and the reference point 215.

In the embodiment shown by FIG. 2, the HMD 200 includes an eye monitoring system 120 comprising an illumination source 225, such as a camera, and an illumination source 230 configured to emit a series of periodic illumination patterns, with each periodic illumination pattern phase shifted by a different amount into an eye of the user that is enclosed by the HMD 200. In various embodiments, the illumination source 230 emits a sinusoidal pattern, a near sinusoidal pattern, or any other periodic pattern (e.g., a square wave). For example, the illumination source 230 emits a series of sinusoids that each have a different phase shift onto the eye of the user within the HMD 200. The imaging device 225 captures images of the eye of the user within the HMD 200, which are used to calculate depths of portions or the eye of the user relative to the eye monitoring system 120, as further described below in conjunction with FIGS. 3-5.

Figure 3:
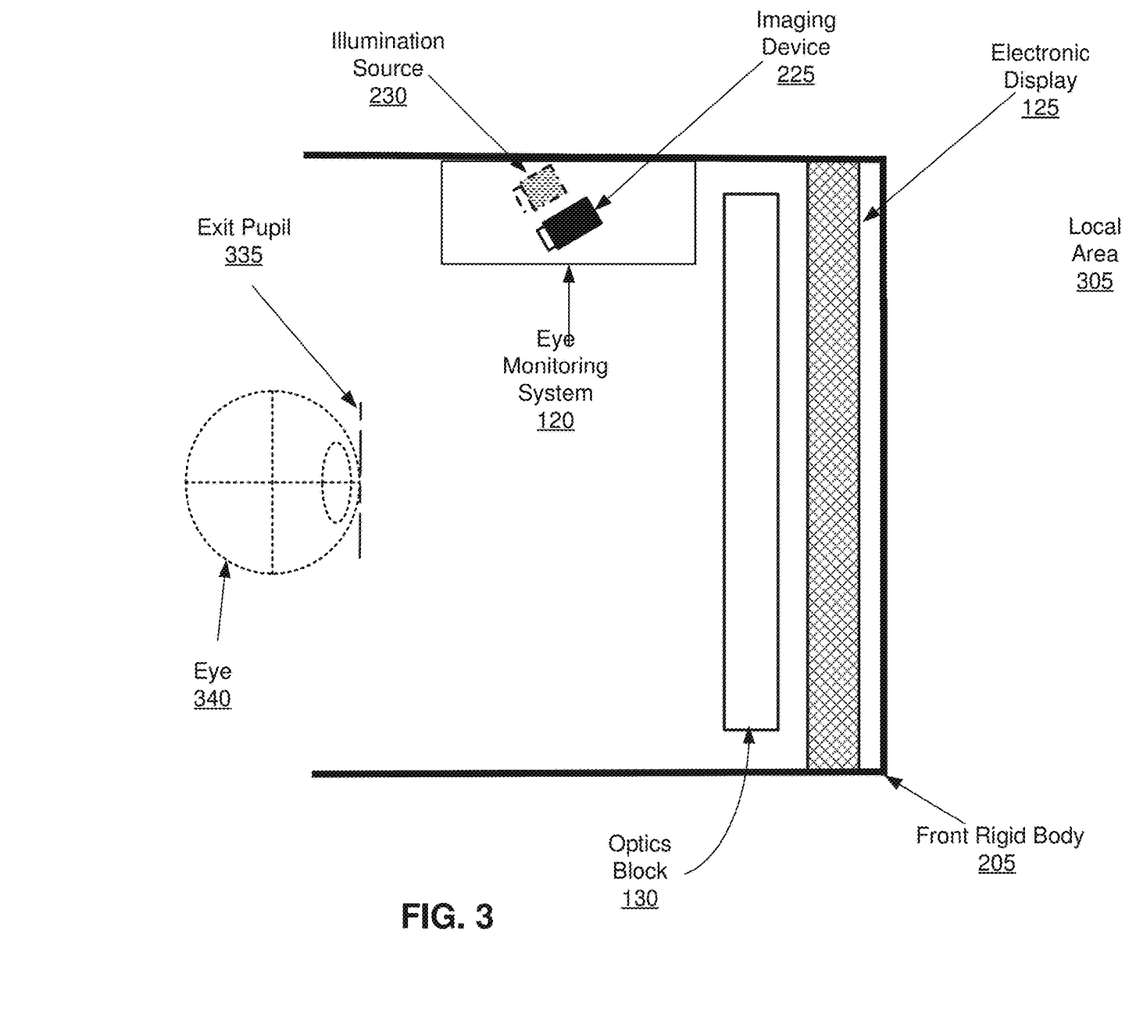
FIG. 3 is a cross section of a front rigid body of a head mounted display (HMD), in accordance with an embodiment.

FIG. 3 is a cross section of the front rigid body 205 of the HMD 200 depicted in FIG. 2. As shown in FIG. 3, the front rigid body 205 includes an eye monitoring system 120 including an imaging device 225 and an illumination source 230. The front rigid body 205 also has an optical axis corresponding to a path along which light propagates through the front rigid body 205. Additionally, the front rigid body 205 includes the electronic display 125 and the optics block 130, which are further described above in conjunction with FIG. 1. The front rigid body 205 also includes an exit pupil 335 where the user's eye 340 is located. For purposes of illustration, FIG. 3 shows a cross section of the front rigid body 205 in accordance with a single eye 340. The illumination source 230 projects light toward the exit pupil 335 of the front rigid body 205, where the user's eye 340 is located. Light reflected by the user's eye 340 is subsequently captured by the imaging device 225, which is positioned so the exit pupil 335 of the front rigid body 305 is within a field of view of the imaging device 225.

As described above in conjunction with FIG. 1, the electronic display 125 emits light forming an image toward the optics block 130, which alters the light received from the electronic display 125. The optics block 130 directs the altered image light to the exit pupil 335, which is a location of the front rigid body 205 where a user's eye 340 is positioned. FIG. 3 shows a cross section of the front rigid body 205 for a single eye 340 of the user, with another electronic display 125 and optics block 130, separate from those shown in FIG. 3, included in the front rigid body 205 to present content, such as an augmented representation of a local area 305 surrounding the HMD 200 or virtual content, to another eye of the user.

As further described above in conjunction with FIG. 2, the illumination source 230 of the eye monitoring system 120 emits a series of periodic illumination patterns, with each periodic illumination pattern phase shifted by a different amount into the area within the front rigid body 205 of the HMD 105 between a front side of the front rigid body 205 and the exit pupil 335 of the front rigid body 205 of the HMD 105, and the imaging device 225 captures images of the periodic illumination patterns reflected by the user's eye 340 using a sensor comprising multiple pixels. Each pixel captures intensity of light emitted by the illumination source 230 and reflected by locations on the user's eye 340 and communicates the captured intensity to a controller or to the console 110, which determines a phase shift for images of the captured intensity, as further described below in conjunction with FIGS. 4-6B, and determines depths of locations on the user's eye 340 onto which the light emitted by the illumination source 230 was reflected and captured by the imaging device 225, also further described below in conjunction with FIGS. 4-6B. As further described below, determining a phase shift for a set of multiple images including captured intensities of light emitted by the illumination source 230 and reflected by locations on the user's eye 340 enables estimation of a phase shift between a pixel and the set of illumination timing from the set of multiple images.

Eye Monitoring System Assembly

Figure 4:
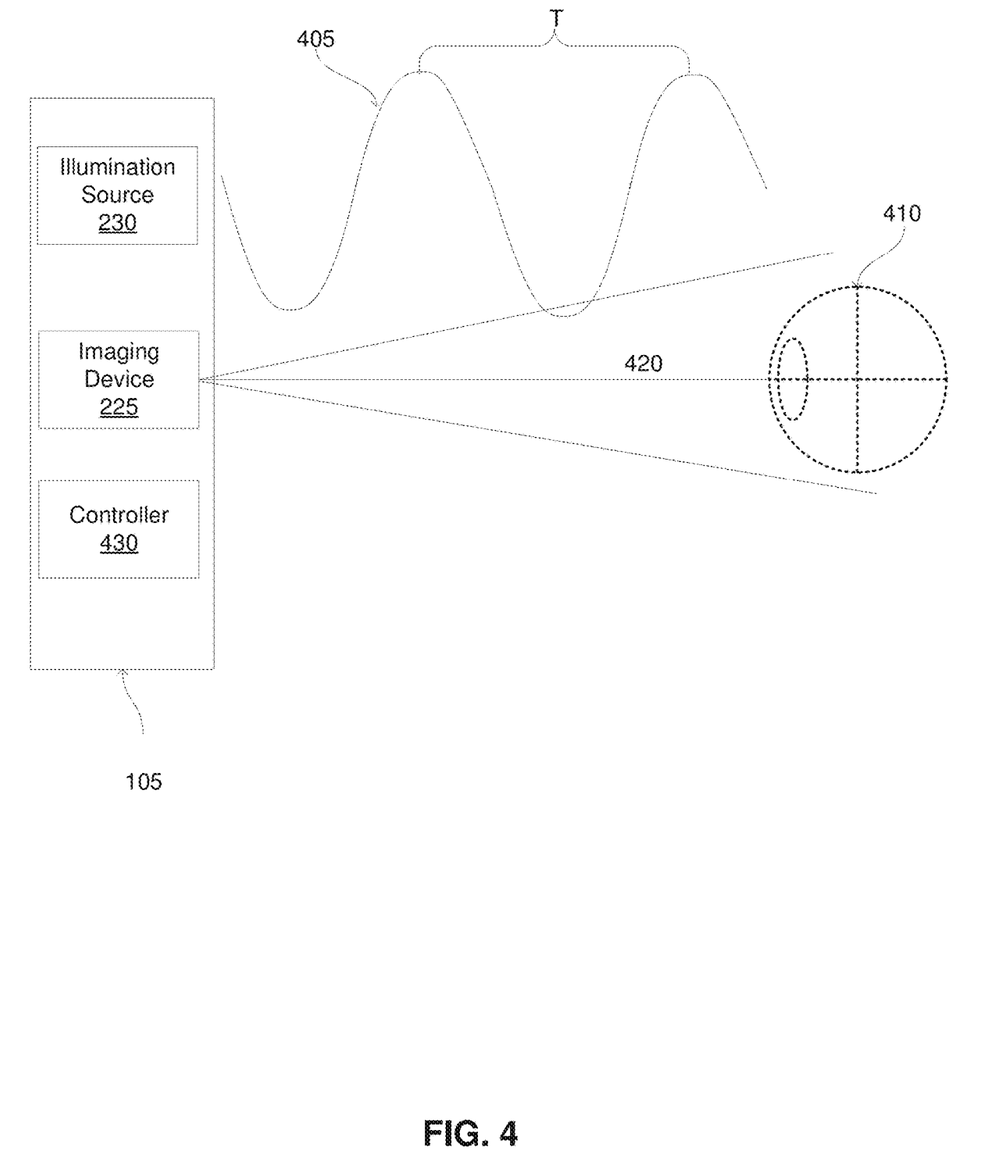
FIG. 4 is an example of light emitted into an eye of a user within a head mounted display and captured by an eye monitoring system, in accordance with an embodiment.

FIG. 4 example of light emitted into a local area and captured by an eye monitoring system 120 included in a head mounted display (HMD) 105. FIG. 4 shows an imaging device 225 and an illumination source 230 of the eye monitoring system 120 included in the HMD 105. In the example of FIG. 4, the illumination source 230 emits an intensity pattern of light 405 onto the user's eye 410 positioned at the exit pupil 335 of the front rigid body 205 of the HMD 105 and within a field of view of the imaging device 225. The intensity pattern of light 405 has a period T known to the eye monitoring system 120. In some embodiments, the illumination source 230 emits a narrow pulse of illumination with the period T to emit the intensity pattern of light 405. However, in other embodiments, the illumination source 230 emits any suitable intensity pattern having a period T known to the eye monitoring system 120, such as a continuously modulated waveform.

Each pixel of the sensor of the imaging device 225 provides an intensity of light from the intensity pattern of light 405 captured in multiple images to the controller 430 or to the console 110, which determines a phase shift, ϕ, of the intensity pattern of light 405 captured by each pixel of the sensor. Each image captured by the imaging device 225 is a digital sampling of the intensity pattern of light 405, so the set of images captured by the sensor represent a Fourier transform of the continuous intensity pattern of light 405, and the Fourier components, $a_1$ and $b_1$, of the fundamental harmonic of the intensity pattern of light 405 are directly related to the phase shift for a pixel of the sensor. For images captured by a pixel of the sensor, the Fourier components $a_1$ and $b_1$ are determined using the following equations:

$$a_1 = \sum_{n=1}^{N} S_n \cos(\theta_n)\Delta\theta \qquad (1)$$

$$b_1 = \sum_{n=1}^{N} S_n \sin(\theta_n)\Delta\theta \qquad (2)$$

In the preceding, $S_n$ denotes an intensity of the pixel of the sensor in a particular image, n, captured by the sensor, and the set $\theta_n$ of represents the phase shifts introduced into the intensity pattern of light 405. For example, if three phase shifts are used, the set of $\theta_n$ includes 0 degrees, 120 degrees, and 240 degrees. As another example, if four phase shifts are used the set of $\theta_n$ includes 0 degrees, 90 degrees, 180 degrees, and 270 degrees. In some embodiments, the set of $\theta_n$ is determines so 0 degrees and 360 degrees are uniformly sampled by the captured images, but the set of $\theta_n$ may include any values in different implementations.

From the Fourier components $a_1$ and $b_1$ determined as described above, the controller or the console determines the phase shift ϕ of the intensity pattern of light 405 captured by a pixel of the sensor as follows:

$$\phi(R) = \tan^{-1}\left(\frac{a_1}{b_1}\right) - \theta_1 \qquad (3)$$

$$R = \sqrt{a_1^2 + b_1^2}$$

In the preceding, ϕ is the phase shift of the continuous intensity pattern of light 405, R is the magnitude of the continuous intensity pattern of light 405, and $\theta_1$ is a calibration timing offset. For each frequency of the intensity pattern of light 405, the controller 430 determines phase shifts using the intensity of the pixel of the sensor in captured images. From the determined phase shift, the controller 430 determines a depth 420 from of the location of a portion of the user's eye 410 from which the pixel of the sensor captures intensities of the intensity pattern of light 405, The eye monitoring system 120 determines phase shifts for each of at least a set of pixels of the sensor of the imaging device 225, as described above. For each of at least the set of pixels, the eye monitoring system 120 determines a depth from the eye monitoring system 120 to a location of a portion of the user's eye 410 from which a pixel of the set captured the intensity pattern of light 405 emitted onto the user's eye 410 based on the phase shift of light captured by the pixel of the set. This allows different pixels of the sensor of the imaging device 225 to determine depths of different portions of the user's eye 410 from which different pixels captured the intensity pattern of light 405. In some embodiments, each pixel of the sensor of the imaging device 225 determines a depth from the eye monitoring system 120 to a location of a portion of the user's eye 410 enclosed by the front rigid body 205 of the HMD 105 from which a pixel captured the intensity pattern of light 405 in various images. The eye monitoring system 120 may generate a depth map identifying depths from the eye monitoring system 120 to different portions of the user's eye which different pixels of the imaging device 225 captured the intensity pattern of light 405. For example, the generated depth map identifies depths from the eye monitoring system 120 to locations of different portions of the user's eye 410 based on phase shifts of the intensity pattern of light 405 captured by each pixel of the sensor, with a depth corresponding to a pixel of the sensor of the imaging device 225 that captured the intensity pattern of light 405 used to determine the depth.

Because the eye monitoring system 120 is included in the HMD 105 and positioned to emit light onto the user's eye 410 and to capture light reflected by the user's eye, a range of depths over which the eye monitoring system 120 captures emitted light is known from dimensions of the HMD 105. Hence, unlike configurations where depth is determined for objects in an arbitrary environment, the eye monitoring system 120 is configured to capture depths within the range of depths determined by dimensions of the HMD 105 (e.g., a distance from the eye monitoring system 120 to an exit pupil 335 of the front rigid body 205 off the HMD 105), allowing the intensity pattern of light 405 emitted by the illumination source 230 to have a single modulation frequency. For example, the illumination source 230 is configured to emit one or more intensity patterns of light 405 each modulated by a common, single, frequency within a range of 150-200 MHz, allowing the eye monitoring system 120 to unambiguously resolve depths between 0.75-1.0 meters. In other embodiments, the illumination source modulates the one or more intensity patterns of light 405 using any suitable frequency that accounts for distance between the imaging device 225 relative to the user's eyes; for example, closer positioning of the imaging device 225 to the user's eye allows use of higher frequencies to modulate the one or more intensity patterns of light 405. As an example, a frequency of 1 GHz provides a range of approximately 200 nanometers for resolving depths.

In alternative embodiments, the intensity pattern of light 405 includes two or more spatial frequencies in sequence, which increases a range of phases within which phase shifts may be unambiguously identified. The range of phases is extended for a subset of pixels within the sensor of the imaging device 225 based on a maximum parallax expected during operation of the imaging device 225, which may be determined based on a difference between a maximum range and a minimum range of the imaging device 225. Hence, the range of phases may be is extended for the subset of pixels of the sensor most likely to capture light from the intensity pattern of light 405.

Figure 5:
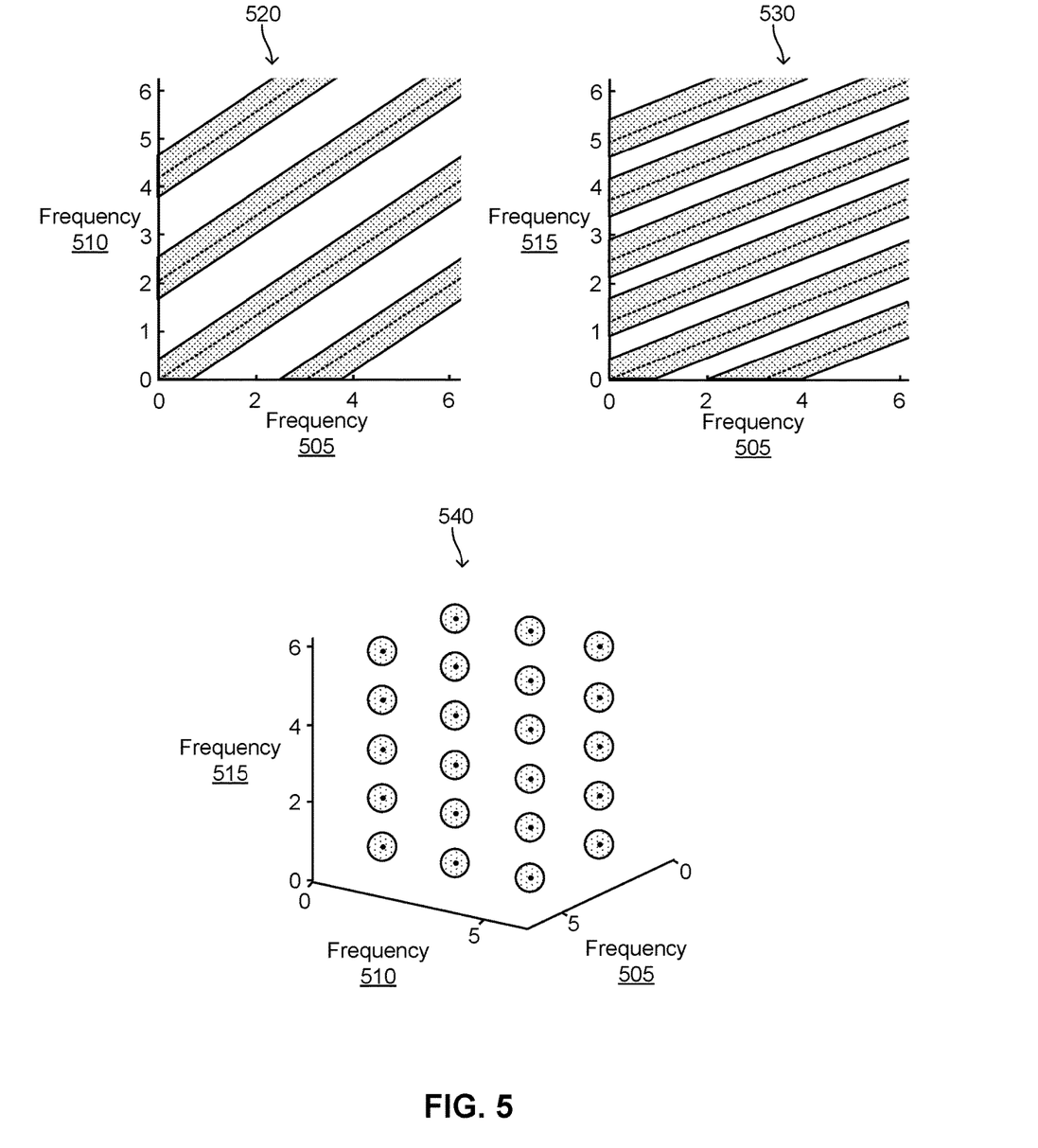
FIG. 5 is an example of using multiple frequencies of a continuous intensity pattern of light emitted by an eye monitoring system to identify a phase shift for a pixel of the sensor, in accordance with an embodiment.

FIG. 5 shows an example of using two frequencies of an intensity pattern of light emitted by an eye monitoring system 120 to identify a phase shift for a pixel of a sensor of the imaging device 225 of the eye monitoring system. In the example of FIG. 5, phase shifts identified from frequency 505 repeat through the interval of 0 and $2\pi$ radians three times in a time interval, while phase shifts identified from frequency 510 repeat through the interval of 0 and $2\pi$ radians twice in the time interval, as shown in plot 520. Hence, emitting light patterns having frequency 505 and frequency 510 allows the eye tracking system 120 to identify a phase shift in the time interval over a larger interval than between 0 and $2\pi$ (i.e., "unwraps" the phase shifts that may be unambiguously identified). FIG. 5 shows another example where, phase shifts identified from frequency 505 repeat through the interval of 0 and $2\pi$ radians five times in a time interval, while phase shifts identified from frequency 515 repeat through the interval of 0 and $2\pi$ radians twice in the time interval, as shown in plot 530. This similarly allows the eye monitoring system 120 to identify a phase shift in the time interval over a larger interval than between 0 and $2\pi$ (i.e., "unwraps" the phase shifts that may be unambiguously identified). Additionally, FIG. 5 also shows an analogous three dimensional plot 540 of frequency 505, frequency 510, and frequency 515, which may further extend the range of phases over which phase shifts may be unambiguously identified. In other embodiments, any number of frequencies of the intensity pattern 405 of light may be used to identify the phase shift for the pixel of the sensor using the process further described above.

Imaging Device Sensor

Figure 6A:
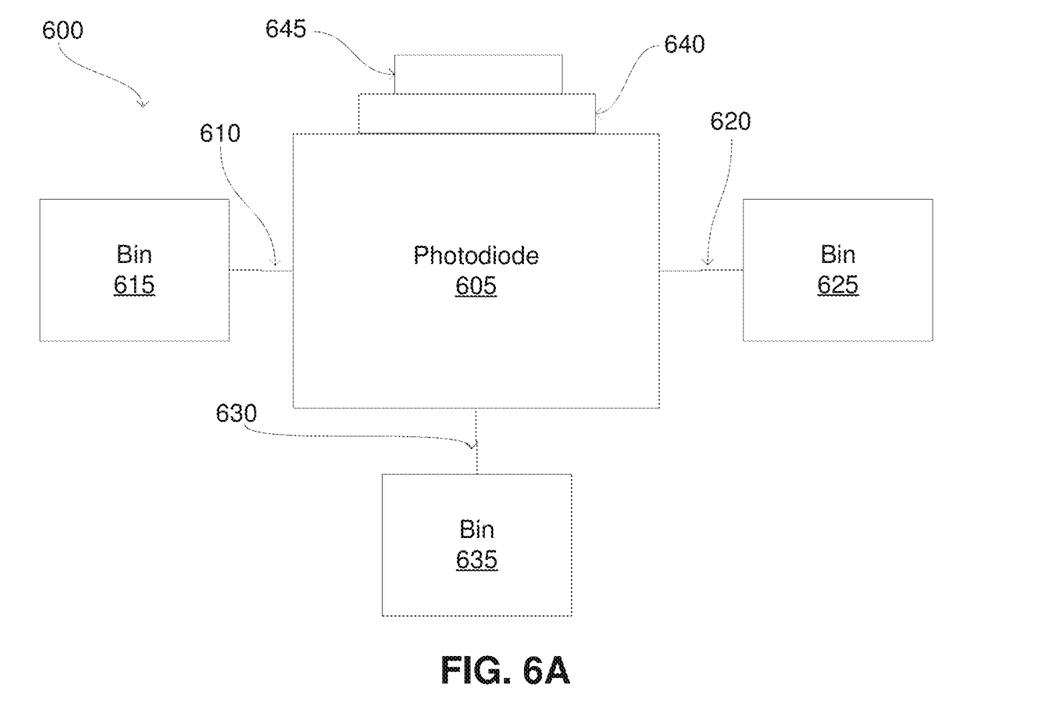
FIG. 6A is an example pixel of a sensor included in an imaging device of an eye monitoring system, in accordance with an embodiment.

FIG. 6A shows an example pixel 600 of a sensor included in an imaging device 225 of an eye monitoring system 120. In the example of FIG. 6, the pixel 600 includes a photodiode 605 coupled to multiple charge storage bins 615, 625, 635. While FIG. 6A shows three charge storage bins 615, 625, 635 coupled to the photodiode 605, in other embodiments, the pixel 600 is coupled to more than three charge storage bins 615, 625, 635. The photodiode 605 is coupled to charge storage bin 615 via transfer gate 610, coupled to charge storage bin 625 via transfer gate 620, and coupled to charge storage bin 635 via transfer gate 630.

A controller is coupled to the illumination source 230 of the DCA 120, which is further described above in conjunction with FIG. 4, and also to the sensor of the imaging device 225. The controller provides control signals to transfer gate 610, transfer gate 620, and transfer 630 based on times when the illumination source 230 emits a periodic illumination pattern. In various embodiments, the illumination source 230 is activated to emit a periodic illumination pattern, is deactivated, and is activated again to emit another periodic illumination pattern. When the illumination source 230 is deactivated, the controller communicates control signals to transfer gate 610, transfer gate 620, and transfer gate 630. The control signals cause a single transfer gate 610, 620, 630 to open, while the other transfer gates 610, 620, 630 remain closed, so charge accumulated by the photodiode 605 while the illumination source 230 was activated is transferred to the charge storage bin 615, 625, 635 coupled to the photodiode via the open single transfer gate 610, 620, 630. The open transfer gate 610, 620, 630 is closed when the illumination source 230 is again activated, and control signals from the controller open another transfer gate 610, 620, 630, so charge accumulated by the photodiode 605 while the illumination source 230 was active is transferred to a charge storage bin 615, 625, 635 via the open transfer gate 610, 620, 630.

Figure 6B:
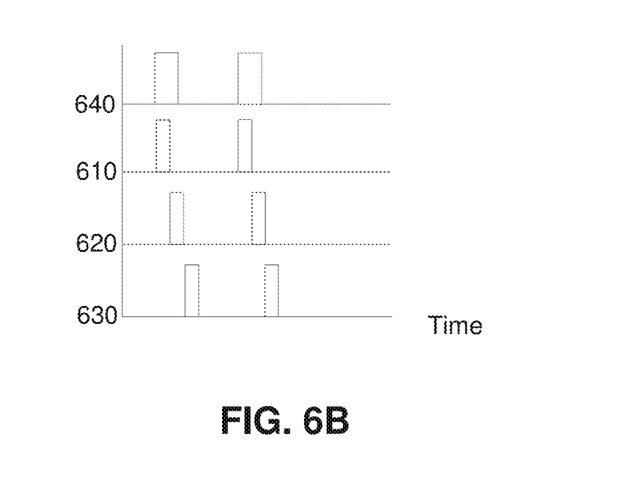
FIG. 6B is an example of control signals operating the example pixel shown in FIG. 6A, in accordance with an embodiment.

FIG. 6B is one example of control signals regulating operation of the pixel 600 shown in FIG. 6A. For purposes of illustration, FIG. 6B identifies a signal 640 indicating times when the illumination source 230 emits light. When the signal 640 has a maximum value in FIG. 6B, the illumination source 230 emits a periodic illumination pattern. FIG. 6B also shows control signals provided to transfer gate 610, transfer gate 620, and transfer gate 630. In the example of FIG. 6B, when a control signal provided to a transfer gate 610, 620, 630 has a maximum value, the transfer gate 610, 620, 630 receiving the control signal is open; when the control signal provided to a transfer gate 610, 620, 630 has a minimum value, the transfer gate 610, 620, 630 is closed.

In the example of FIG. 6B, when the illumination source 230 is initially activated and emits a periodic illumination pattern. While the illumination source 230 is emitting the periodic illumination pattern, transfer gate 610 receives a control signal that opens transfer gate 610, while transfer gate 620 and transfer gate 630 remain closed. Charge accumulated by the photodiode 605 while the illumination source 230 is activated is transferred into charge storage bin 615 via transfer gate 610. Subsequently, but while the illumination source 230 remains active and emitting the periodic illumination pattern, transfer gate 610 is closed, and transfer gate 620 receives a control signal that opens transfer gate 620, while transfer gate 630 remains closed. Charge accumulated by the photodiode 605 while the illumination source 230 is active is transferred into charge storage bin 625 via transfer gate 620. While transfer gate 620 is open, the illumination source 230 is deactivated and stops emitting the periodic illumination pattern. Hence, when the illumination source is deactivated, transfer gate 620 is open, while transfer gate 610 and transfer gate 620 are closed. Transfer gate 620 is subsequently closed, and transfer gate 630 receives a control signal that opens transfer gate 630, while the illumination source 230 is deactivated and while transfer gate 610 remains closed. Charge accumulated by the photodiode 605 is transferred into charge storage bin 635 by transfer gate 630. In various embodiments, the pixel 600 also includes a drain 645 coupled to the photodiode 605 via a shutter 640, further described below, and the shutter 640 receives a control signal that opens the shutter 640. In some embodiments, the control signal causes the shutter 640 to open after transfer gates 610, 620, 630 have each been opened and before the illumination source 230 is activated, so charge accumulated by the photodiode 605 is transferred to the drain 645 via the shutter 640. The shutter 640 remains open in various embodiments, until being closed when the illumination source 230 is activated.

In other embodiments, relative timing between control signals activating the illumination source 230 and controls activating transfer gates 610, 620, 630 may differ. For example, a control signal activates a transfer gate 610, 620, 630 so the transfer gate 610, 620, 630 is active for at least a portion of a time while the illumination source 230 is active and emitting the periodic illumination pattern. As another example, control signals activating a transfer gate 610, 620, 630 are received by a transfer gate 610, 620, 630 after the illumination source 230 has been deactivated for a specific amount of time, adding a delay between deactivation of the illumination source 230 and activation of a transfer gate 610, 620, 630. However, the preceding are merely examples, and the pixel 600 may be operated in any suitable manner in different embodiments. In some embodiments, the controller determines a signal to noise ratio from the charge is accumulated in charge storage bins 615, 625, 635 and compares the determined signal to noise ratio to a threshold. If the determined signal to noise ratio is less than the threshold, the controller provides control signals to open and close transfer gates 610, 620, 630, as further described above, until the signal to noise ratio determined from the charge accumulated in charge storage bins 615, 625, 635 equals or exceeds the threshold. If the determined signal to noise ratio equals or exceeds the threshold, the controller combines the charge stored in each of charge storage bin 615, 625, 635 to determine an intensity of light from the illumination source 230 captured by the pixel 600 and determines a depth of a location within the from which the pixel 600 captured light form the illumination source 230, as further described above in conjunction with FIGS. 4 and 5. Accumulating charge in a single charge storage bin 615, 625, 635 coupled to the photodiode 605 by an open transfer gate 610, 620, 630 limits accumulation of background noise caused by the photodiode 605 capturing light from sources other than the illumination source 230, allowing the pixel 600 to have a higher signal to noise ratio than other techniques. Additionally, accumulating charge from the photodiode 605 in different charge storage bins 615, 625, 635 allows the pixel to multiplex phase shift determinations for the periodic illumination pattern captured by the pixel 600, which reduces the number of images for the image capture device 225 to capture to determine the phase shift of the periodic illumination pattern captured by the pixel 600 and reduces an amount of time the pixel 600 captures light emitted from the illumination source.

Referring back to FIG. 6A, the pixel 600 also includes a drain 645 coupled to the photodiode 605 via a shutter 640. When the illumination source 230 is deactivated, the controller provides a control signal to the shutter 640 that causes the shutter 640 to open and couple the photodiode 605 to the drain 645. Coupling the photodiode 605 to the drain 645 while the illumination source is deactivated discharges charge produced by the photodiode 605 from ambient light in the front rigid body 205 of the HMD 105 and within a field of view of the imaging device 225. When the illumination source 230 is activated, the controller provides an alternative control signal to the shutter 640 that closes the shutter 640 to decouple the photodiode 605 from the drain 645. Additionally, the shutter 640 may be configured to open if a charge accumulated by the photodiode 605 from captured light equals or exceeds a threshold value, allowing charge accumulated by the photodiode 605 to be removed via the drain 645, preventing the photodiode 605 from saturating and preventing charge accumulated by the photodiode 605 from being transferred into adjacent pixels 600. The shutter 640 is configured to couple the photodiode 605 to the drain 645 until the charge accumulated by the photodiode 605 is less than the threshold or is at least a threshold amount below the threshold in some embodiments.

Example Depth Information for a User's Eye

Figure 7:
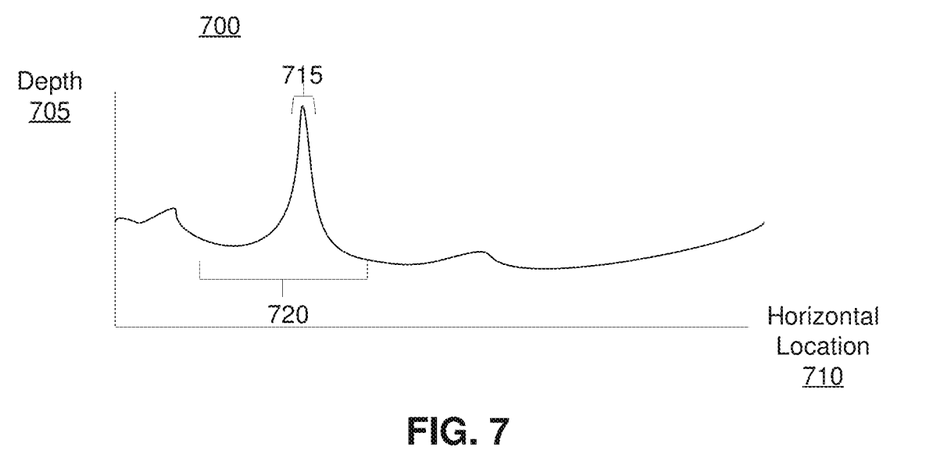
FIG. 7 is an example depth cross section of a user's eye from an image captured by an eye monitoring system, in accordance with an embodiment.

FIG. 7 is an example depth cross section 700 of an image captured by an eye monitoring system 120 that includes a user's eye, as further described above. In the example shown by FIG. 7, the depth cross section 700 depicts a depth 705 determined for different horizontal locations 710 within the captured image. FIG. 7 illustrates depths 705 determined for different locations within an image captured by the imaging device 225 of the eye monitoring system 120 along a horizontal axis originating at a leftmost boundary of the image. In various embodiments, the depth cross section 700 is generated by a controller 430 of the eye monitoring system 120 or by a console 110 receiving depth information from the eye monitoring system 120.

The controller 430 or the console 110 uses one or more methods to identify one or more features of the user's eye from the depth cross section 700. For example, the illumination source 230 of the eye monitoring system 120 emits light having infrared wavelengths, such as between 850 nm and 940 nm, which is reflected by a retina of the user's eye, allowing the controller 430 to determine a depth to the retina of the user's eye from light reflected by the retina of the user's eye through a pupil aperture of the user's eye and captured by the eye monitoring system 120 as further described above. This allows the controller 430 to identify a location 715 within a captured image corresponding to the pupil of the user's eye by identifying one or more horizontal locations 710 in a captured image for which a maximum depth was determined. Using depth information allows the location 715 corresponding to the pupil of the user's eye to be identified more quickly and with lower compute cost than with conventional methods that apply a machine learned model to an image including the user's eye to locate the pupil of the user's eye. Additionally, the controller 430 may determine a change in one or more dimensions of the location 715 corresponding to the pupil of the user's eye from depth cross sections 700 captured at different times, and determine a change in accommodation of the user's eye based on a change of a dimension of the location 715 corresponding to the pupil of the user's eye.

As another example, the controller 430 identifies a location 720 of an iris of the user's eye based on determined depth information, such as the depth cross section 700, by identifying locations corresponding to depths within a threshold distance of each other and within a threshold distance of the location 715 corresponding to the pupil of the user's eye as a location 720 of an iris of the user's eye. By treating the iris of the user's eye as a flat surface, locations proximate to each other and having depths within a threshold distance of each other are identified as the location 720 of the iris of the user's eye. Accounting for distance of the locations having depths within the threshold distance of each other from the location 715 corresponding to the pupil of the user's eye allows the controller 430 to identify the location 720 of the iris of the user's eye more accurately and more quickly than other techniques, such as glint tracking. In other embodiments, any suitable method may be used to identify the location 720 of the iris of the user's eye. For example, a predetermined model specifying relative locations of the iris of the user's eye and the pupil of the user's eye is applied by the controller 430 to the depth information, allowing the controller 430 to identify the location 720 of the iris of the user's eye based on the depth information and the model. As another example, the controller 430 applies a machine learned model to the captured intensity images of the user's eye that extracts masks corresponding to features of the user's eye (e.g., a location of the pupil, a location of the iris, a location of the sclera, etc.) and applies the masks to the depth information to identify locations in the depth information for masks corresponding to different features of the user's eye. Additionally, from the location 715 corresponding to the pupil of the user's eye and the location 720 of the iris of the user's eye, the controller 430 may also determine an optical axis of the user's eye by determining a normal to the location 720 of the iris of the user's eye positioned at the location 715 corresponding to the pupil of the user's eye. In various embodiments, the controller 430 determines a visual axis of the user's eye based on the determined optical axis of the user's eye through any suitable method or methods.

While FIG. 7 shows determination of the location 715 corresponding to a pupil of the user's eye and the location 720 of the iris of the user's eye from a depth cross section 700 of an image, depth information from the eye monitoring system 120 may be analyzed using any suitable method in various embodiments. For example, the eye monitoring system 120 applies one or more machine learned models to depth information to identify features of the user's eye in various embodiments. As another example, the eye monitoring system 120 performs a two dimensional analysis of images captured by the eye monitoring system 120 to identify features of the user's eye. For example, the eye monitoring system 120 applies one or more machine learned models to captured images that identify features of the user's eye from the captured images.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. An apparatus comprising:
   a head mounted display (HMD) comprising a front rigid body having an exit pupil specifying a position for an eye of a user and including an eye monitoring system positioned within the front rigid body, the eye monitoring system including:
   an illumination source configured to emit light comprising temporally periodic illumination patterns into an area within the front rigid body between the eye monitoring system and the exit pupil, each periodic illumination pattern phase shifted by a different amount into the area within the front rigid body;
   an imaging device including a sensor, the sensor comprising multiple pixels, the sensor configured to capture light from the periodic illumination patterns reflected by the eye, each pixel of the sensor configured to capture images including intensities of light reflected from the eye, wherein each pixel of the sensor comprises:
   a photodiode configured to accumulate charge based on captured light reflected by the eye, and
   a plurality of charge storage bins coupled to the photodiode, each charge storage bin coupled to the photodiode by a respective transfer gate; and
   a controller configured to:
   receive an intensity of light captured by each of at least a set of the pixels of the sensor,
   identify a pixel of the sensor,
   determine an intensity of light reflected from the eye and captured by the identified pixel,
   communicate a first control signal to the sensor opening a first transfer gate coupling a photodiode of the identified pixel to a first charge accumulation bin, and
   communicate a second control signal to the sensor opening a second transfer gate coupling the photodiode of the identified pixel to a second charge accumulation bin while the first transfer gate and other transfer gates coupled to the photodiode of the identified pixel are closed.

2. The apparatus of claim 1, wherein the controller is further configured to:
   determine a phase shift of the light captured by the identified pixel based on the intensities; and
   determine a depth from the imaging device to a location of the eye of the user based on the determined phase shift and a specific distance between the illumination source and the imaging device.

3. The apparatus of claim 2, wherein the controller is further configured to:
   identify depths between the sensor and different locations of the eye from which individual pixels of the sensor captured light; and
   identify one or more features of the eye from the identified depths.

4. The apparatus of claim 3, wherein the controller is further configured to:
   identify a location of the eye corresponding to a largest among the identified depths as a location of a pupil of the eye.

5. The apparatus of claim 4, wherein the controller is further configured to:
   identify a location of an iris of the eye based on the location of the pupil and the identified depths.

6. The apparatus of claim 5, wherein the controller is further configured to:
   determine an optical axis of the eye as a normal to the location of the iris positioned at the location of the pupil.

7. The apparatus of claim 1, wherein the controller is further configured to:
   apply one or more machine learned models to the captured images including the intensities to identify one or more features of the eye.

8. The apparatus of claim 7, wherein a feature of the one or more features is selected from a group consisting of: a location of a pupil of the eye, a location of an iris of the eye, a location of a sclera of the eye, and any combination thereof.

9. The apparatus of claim 1, wherein the controller is further configured to:
communicate a third control signal to the sensor opening a third transfer gate coupling the photodiode of the identified pixel to a third charge accumulation bin while the first transfer gate, the second transfer gate and one or more remaining transfer gates coupled to the photodiode of the identified pixel are closed.

10. The apparatus of claim 1, wherein each of the temporally periodic illumination patterns comprises pulses of light emitted at a periodic time interval.

11. A method comprising:
emitting a plurality of periodic illumination patterns from an illumination source included in a headset into an area within the headset between the illumination source and an exit pupil of the headset that specifies a position of an eye of a user, each periodic illumination pattern phase shifted by a different amount into an area within a front rigid body;
capturing light from the periodic illumination patterns by an imaging device including a sensor, the sensor comprising multiple pixels that are each configured to capture images including intensities of light reflected from the eye, the imaging device separated from the illumination source by a distance, wherein each pixel of the sensor comprises:
a photodiode configured to accumulate charge based on captured light reflected by the eye, and
a plurality of charge storage bins coupled to the photodiode, each charge storage bin coupled to the photodiode by a respective transfer gate;
identifying a pixel of the sensor;
determining an intensity of light reflected from the eye and captured by the identified pixel;
communicating a first control signal to the sensor opening a first transfer gate coupling a photodiode of the identified pixel to a first charge accumulation bin; and
communicating a second control signal to the sensor opening a second transfer gate coupling the photodiode of the identified pixel to a second charge accumulation bin while the first transfer gate and other transfer gates coupled to the photodiode of the identified pixel are closed.

12. The method of claim 11, further comprising:
determining a phase shift of the light captured by the identified pixel based on the intensities; and
determining a depth from the imaging device to a location of the eye from which the identified pixel captured light based on the determined phase shift.

13. The method of claim 12, further comprising:
identifying depths between the sensor and different locations of the eye from which individual pixels of the sensor captured light; and
identifying one or more features of the eye from the identified depths.

14. The method of claim 13, further comprising:
identifying a location of the eye of the user corresponding to a largest among the identified depths as a location of a pupil of the eye.

15. The method of claim 14, further comprising:
identifying a location of an iris of the eye based on the location of the pupil and the identified depths.

16. The apparatus of claim 15, further comprising:
determining an optical axis of the eye as a normal to the location of the iris positioned at the location of the pupil.

17. The method of claim 11, further comprising:
applying one or more machine learned models to the captured images including the intensities to identify one or more features of the eye.

18. The method of claim 11, wherein a feature of the one or more features is selected from a group consisting of: a location of a pupil of the eye, a location of an iris of the eye, a location of a sclera of the eye, and any combination thereof.

19. The method of claim 11, wherein each periodic illumination pattern comprises pulses of light emitted at a periodic time interval.

\* \* \* \* \*

UNITED STATES PATENT AND TRADEMARK OFFICE
CERTIFICATE OF CORRECTION

| | | |
|---|---|---|
| PATENT NO. | : 11,567,318 B1 | Page 1 of 1 |
| APPLICATION NO. | : 16/135452 | |
| DATED | : January 31, 2023 | |
| INVENTOR(S) | : Michael Hall et al. | |

It is certified that error appears in the above-identified patent and that said Letters Patent is hereby corrected as shown below:

In the Claims

In Column 18, Line 9, Claim 12, delete "light" and insert -- light, --, therefor.

In Column 18, Line 25, Claim 16, delete "apparatus" and insert -- method --, therefor.

Signed and Sealed this
Sixteenth Day of May, 2023

Katherine Kelly Vidal
*Director of the United States Patent and Trademark Office*